Sept. 13, 1955 V. TULAGIN ET AL 2,717,831
BENZO(H) QUINOLIN-OLS AS AZINE CYAN COLOR FORMERS
Filed Feb. 24, 1953
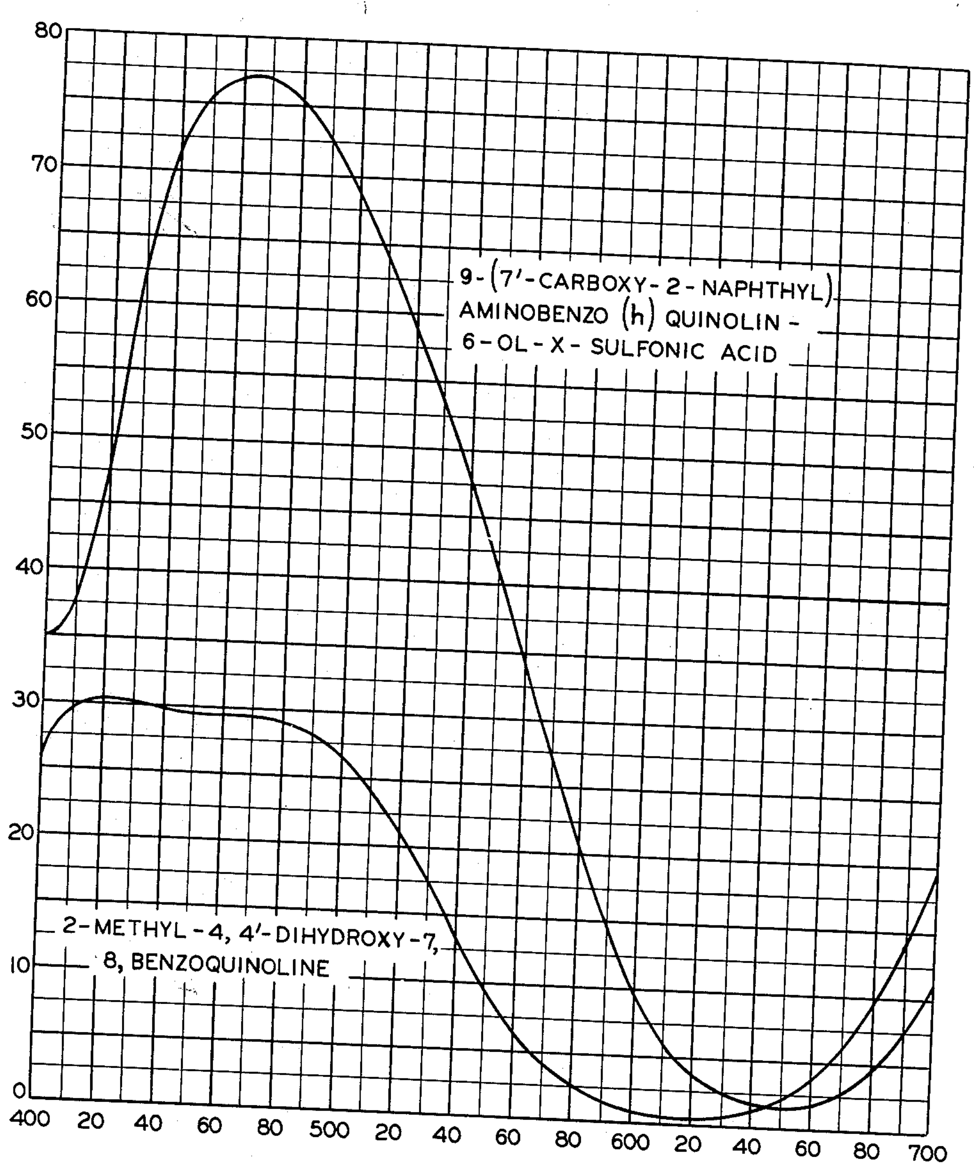
INVENTORS
VSEVOLOD TULAGIN
ROBERT F. COLES
BY Henry W Croyhen
Edward P. Gilheany
ATTORNEYS United States Patent Office 2,717,831

Patented Sept. 13, 1955

2,717,831

BENZO(H)QUINOLIN-OLS AS AZINE CYAN COLOR FORMERS

Vsevolod Tulagin, Binghamton, and Robert F. Coles, Vestal, N. Y., assignors to General Aniline & Film Corporation, New York, N. Y., a corporation of Delaware Application February 24, 1953, Serial No. 338,396

25 Claims. (Cl. 95—6)

The present invention relates to color photography, and more particularly to the use therein of color formers capable of rapid coupling with the oxidation products of a 2,4-diamino metanilic acid to produce brilliant cyan azine dye images.

U. S. P. 2,486,440, granted to W. A. Schmidt and V. Tulagin on November 1, 1949, discloses that azine dye images are produced by developing an exposed silver-halide emulsion with, inter alia, a 2,4-diamino metanilic acid in the presence of a color former containing a reactive methylene group, a phenolic hydroxyl group or the like. Among the color formers containing phenolic hydroxyl groups, the patentees refer to 8-benzene sulfonyl-amino naphthol, 3-sulfo - 6 - aminonaphthol, 8 - hydroxy quinoline and the like. It is apparent that in these color formers the position para to the phenolic hydroxyl group is unsubstituted, and that coupling inevitably takes place in such para-position. It has been our experience that where such para-coupling takes place between the phenolic color former and the oxidation products of an azine developer, a magenta azine dye image is always formed.

The azine dyes produced from available couplers are satisfactory for the yellow and magenta images. In fact, the azine synthesis leads to quite brilliant yellows and magentas. However, available couplers for the cyan have posed a difficult problem both from the standpoint of speed of coupling and the brilliancy of the dyes produced.

Considerable work has been done in an effort to solve this problem. This work has led to the selection, inter alia, as cyan azine color formers of benzo(h)- and (f)-quinolines. The use of such couplers is described in U. S. P. 2,525,502, granted on October 10, 1950, to V. Tulagin and W. A. Schmidt. This patent describes benzoquinoline systems, such as the following:

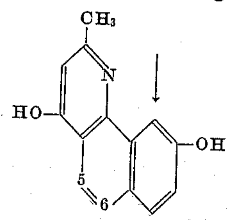

or

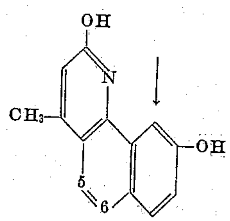

(The arrow in each formula indicates that the benzoquinoline systems couple ortho to the phenolic hydroxyl group.)

It will be evident that each of the above systems requires the presence of two auxochromic groups. These two groups are essential, since otherwise it is impossible to obtain coupling of the color former with the oxidation products of an azine developer. In this connection, we have confirmed that no coupling with such oxidation products is possible with 9-hydroxy benzo(h)quinoline-6-sulfonic acid.

There are, moreover, other pecularities which are evinced by the couplers of U. S. P. 2,525,502. It has been demonstrated that the most effective azine color developers are those described in U. S. P. 2,611,785, granted September 23, 1952, to R. C. Gunther. Rather strangely, however, the benzoquinolines of the aforementioned patent seem to work best with the diaryl substituted azine developers, such as 4,6-diphenylamino metanilic acid.

Furthermore, despite the presence of two auxochromic groups in said color formers, they do not have high coupling speed. For example, even when using 4,6-diphenylamino metanilic acid the couplers of U. S. P. 2,525,502 do not produce a cyan dye image at once. On the contrary, color development gives a deep brown stain which becomes cyan only on prolonged washing or acidification.

The greatest objection, however, to the commercial utilization of the aforesaid couples resides in the particular dye images which they yield on color development. For the most part, said images are of a dull shade which is far off the standards of brilliancy needed for the cyan dye images in a commercial multilayer color film.

We have now discovered a class of benzo(h)quinolines which meet all of the prerequisites of the art, either when considered as to coupling speed or the brilliancy of the dye images obtained on color development. These benzo(h)quinolines are those in which the 5- or 6-position is substituted by hydroxyl, primary amino or a sulfonamido group. The 7, 8, 9 or 10-position may be additionally substituted and preferably there appears an auxochromic group in the 9-position.

Silver-halide emulsions containing such couplers and the processing of such emulsions to cyan azine dye images constitute the purposes and objects of the present invention.

The benzo(h)quinolines contemplated herein, as cyan azine color formers, may be more precisely defined as having the following constitution:

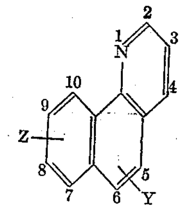

in which Z is hydrogen, hydroxyl, amino, such as $-NH_2$, aliphatic amino, i. e., methylamino, ethylamino, butylamino, decylamino, dodecylamino, tetradecylamino, octadecylamino, and the like, aromatic amino, i. e., phenylamino, α-naphthylamino, β-naphthylamino, toluylamino, carboxy - β - naphthylamino, sulfo-α-naphthylamino, and the like, heterocyclic amino, i. e., pyridylamino, quinolylamino, 4,6-dimethylamino - triazinylamino and the like, acylamino, such as aliphatic carbonamido, i. e., acetylamino, propionylamino, butyrylamino, myristoylamino, stearoylamino, acetyl-N-methylamino, acetyl - N - butylamino, myristoyl-N-decylamino, stearoyl-N-propylamino, acetyl-N-phenylamino, butyl-N-α-naphthylamino, stearoyl-N-toluylamino and the like, aromatic carbonamido, i. e., benzoylamino, α - naphthoylamino, β - naphthoylamino, salicoylamino, benzoyl-N-methylamino, salicoyl-N-propylamino, benzoyl-N-phenylamino, α-naphthoyl-N- toluylamino and the like, aliphatic sulfonylamino, i. e., methylsulfonylamino, ethylsulfonylamino, octadecylsulfonylamino, tetradecylsulfonylamino, ethylsulfonyl-N-ethylamino, octadecylsulfonyl-N-propylamino and the like, aromatic sulfonylamino, i. e., benzenesulfonylamino, α-naphthylsulfonylamino, m-nitrobenzenesulfonylamino, m-aminobenzenesulfonylamino, benzenesulfonyl-N-methylamino, benzenesulfonyl-N-phenylamino, toluenesulfonyl-N-methylamino and the like, and Y is OH, $NH_2$, or $-NHSO_2R$, in which R is an aliphatic radical, such as methyl, ethyl, propyl, butyl, decyl, dodecyl, tetradecyl, octadecyl and the like, or an aromatic radical such as phenyl, nitrophenyl, aminophenyl, naphthyl, toluyl and the like.

Examples of color formers within the stated category are:

Benzo(h)quinolin-5-ol.
Benzo(h)quinolin-6-ol
Benzo(h)quinolin-6,9-diol
9-aminobenzo(h)quinolin-6-ol
9-acetylaminobenzo(h)quinolin-6-ol
9-aminobenzo(h)quinolin-6-ol-X-sulfonic acid
9-acetylaminobenzo(h)quinolin-6-ol-X-sulfonic acid
9-p-toluenesulfonylaminobenzo(h)quinoline-6-ol-X-sulfonic acid
9-octadecylsulfonylaminobenzo(h)quinolin-6-ol-X-sulfonic acid
9-tetradecylsulfonylaminobenzo(h)quinolin-6-ol-X-sulfunic acid
9-(3'-tetradecanoylaminobenzosulfonyl)aminobenzo(h)quinolin-6-ol-X-sulfonic acid of the following formula:

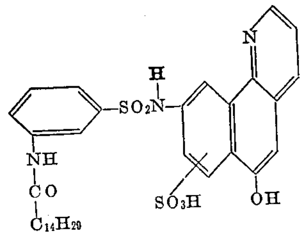

9-(3'-nitrobenzenesulfonyl)aminobenzo(h)quinolin-6-ol-X-sulfonic acid
9-(3'-aminobenzenesulfonyl)aminobenzo(h)quinolin-6-ol-X-sulfonic acid
9-(7'-carboxy-2-naphthyl)aminobenzo(h)quinoline-6-ol-X-sulfonic acid
9-2'-[7'-(1''-octadecyl-5''-sulfo-2''-benzimidazoyl)-phenylcarbamyl]naphthylaminobenzo(h)quinolin-6-ol-X-sulfonic acid of the following formula:

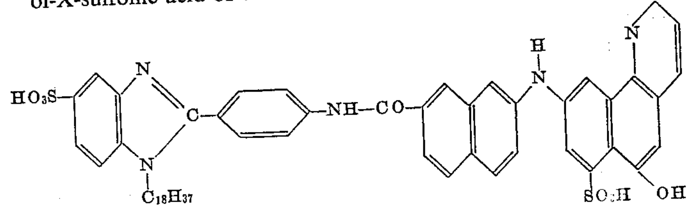

9-methylaminobenzo(h)quinolin-6-ol
9-(4',6-dimethylamino-triazinylamino)-6-ol-X-sulfonic acid of the following formula:

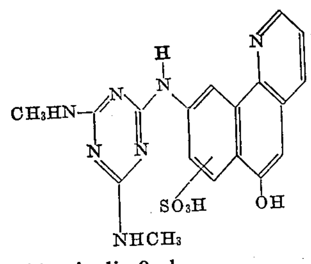

6-aminobenzo(h)quinolin-9-ol 6-p-toluenesulfoamidobenzo(h)quinolin-9-ol
5-aminobenzo(h)quinolin-8-ol
Benzo(h)quinolin-5,9-diol
9-(8'-carboxymethoxy-2-naphthylamino)benzo(h)-quinolin-6-ol-X-sulfonic acid of the following formula:

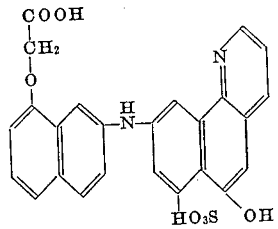

9-methylsulfonylaminobenzo(h)quiolin-6-ol-X-sulfonic acid
9-p-toluenesulfonyl-N-methylaminobenzo(h)quinolin-6-ol
6-methylsulfonylaminobenzo(h)quinolin-9-ol
9-methylsulfonylamino-6-aminobenzo(h)quinoline
6,9-diaminobenzo(h)quinoline
9,2'-[7'-(3''-sulfo-5''-octadecylsulfonylamino-6''-methyl) phenylcarbamyl]naphthylaminobenzo(h)quinolin-6-ol-X-sulfonic acid of the following formula:

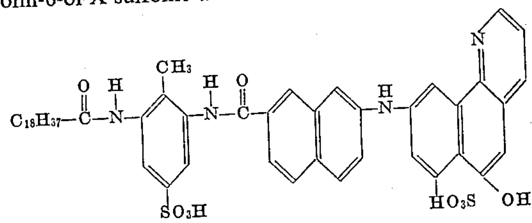

10-aminozenzo(h)quinolin-6-ol.

The above compounds can be made while utilizing conventional chemical processes. For instance, the benzo(h)quinoline ring structure is developed through the reaction of a selected aminonaphthalene sulfonic acid, glycerine, a dehydrating agent such as sulfuric acid and an oxidizing agent such as picric acid. Hydroxyl groups may be substituted for sulfo groups through alkaline fusion. Amino groups may be introduced via hydroxy groups by the well-known Bucherer reaction. Actylation is effected by the use of acid chlorides in the presence of an acid binding agent such as ypridine.

It will be appreciated that several of the compounds listed above contain only a single auxochromic group. Despite this fact, and quite unlike the couplers of U. S. P. 2,525,502 which bear no substituent group in the 5- or 6-position, the couplers have very high coupling speed. This is apparently attributable to the rather remarkable properties provided by the double bond in the 5- 6-position. It is to be pointed out, however, that the most effective couplers are those in which an auxochrome also appears in the 9-position probably because of the resonance thus set up.

Many of the color formers listed above contain a group which renders the color formers fast to diffusion in the photographic emulsion. When such a coupler is selected, it must be used in the emulsion since it would be incapable of diffusing from the developer into the emulsion except as a surface dyeing. Where the couplers do not contain such a non-diffusing group they may be employed either in the developer or in the emulsion.

The color developers which are employed in our process are of the 4,6-diamino metanilic class. Compounds within this category are described in U. S. P. 2,486,440 and 2,611,785. Examples of such developers are 4 - (β-hydroxyethyamino) - 6 - (4' - carboxymethoxy phenylamino)metanilic acid, 4-(hydroxymethylamino)-6-(4'-methoxy phenylamino)metanilic acid, 4,6-di(β-hydroxyethylamino)metanilic acid, 4-hydroxyethylamino-6-phenylamino metanilic acid and the like.

The invention is further explained with reference to the accompanying self-explanatory drawing which depicts the brilliancy of the dyes obtained from 9-(7'-carboxy-2-naphthyl)aminobenzo(h)quinolin-6-ol-sulfonic acid, on the one hand, and 2-methyl-4,4'-dihydroxy-7,8-benzoquinoline, on the other hand, while utilizing as the developer 4-hydroxyethylamino-6-anilo metanilic acid. In the drawing the abscissa is plotted as wave length in millimicrons and the ordinate as log of exposure. It is believed that this drawing speaks for itself in establishing the superior brilliancy of our cyan azine dye images.

The invention is illustrated by the following examples in which the parts are by weight unless otherwise stated. It is to be understood that these examples are not restrictive of the invention.

PREPARATION OF COLOR FORMERS

*Example I*

BENZO(H)QUINOLIN-5-OL

Ninety parts of 4-amino-2-naphthalenesulfonic acid, 240 parts of glycerine, 180 parts of concentrated sulfuric acid and 16.5 parts of picric acid were thoroughly mixed and slowly heated to 140° C. at which point an exothermic reaction started. The temperature was maintained between 140–145° C. by means of external cooling until no more heat was evolved, and then at the same temperature for another 15 minutes by the application of heat. The mixture was cooled to 120° C. and poured into 1500 parts of ice water. The precipitated solid was collected by filtration and thoroughly washed with water. The material so obtained was dissolved in hot concentrated sodium acetate solution, treated with Nuchar and filtered. Upon cooling the filtrate, the sodium salt separated in the form of dark brown crystals. This substance was collected by filtration, redissolved in water and decolorized. The filtered solution was acidified strongly with hydrochloric acid and the solid collected by filtration. This material can be further purified by recrystallization of the sodium salt from water. The product consists of white crystalline needles weighing 59 grams and amounting to a yield of 52%. This substance is fused with sodium hydroxide and converted to 5-hydroxybenzo(h)quinoline.

*Example II*

BENZO(H)QUINOLIN-6-OL

This compound was prepared according to the procedure of Example I, while starting from 1-aminonaphthalene-4-sulfonic acid.

*Example III*

BENZO(H)QUINOLIN-6,9-DIOL

Into a 500 cc. metal beaker were placed 75 grams of potassium hydroxide and 25 grams of sodium hydroxide. The temperature was raised to 200° C. and 25 grams of benzo(h)quinolin-6,9-disulfonic acid was introduced. After the foaming had subsided, the bath temperature was raised to 240–250° C. for 15 minutes and then to 340° C. for 5 minutes. The mixture was cooled somewhat and then treated cautiously with ice until an aqueous solution of about 300 cc. total volume was obtained. The solution was neutralized with acetic acid and cooled, and the precipitated black tar extracted with boiling water containing 25–50 cc. of concentrated hydrochloric acid. The insoluble material was removed by filtering the hot solution through a fluted filter and the cooled filtrate decolorized and neutralized with ammonia. The precipitated dark brown oil gradually became crystalline upon standing.

The benzo(h)quinolin-6,9-disulfonic acid used above was prepared as follows:

Into a 500 cc. 3-necked flask, equipped with a stirrer, a reflux condenser and a thermometer were placed in the order named and with mixing after each addition 50 grams of purified 4-aminonaphthalene-1,6-disulfonic acid, 60 grams of glycerine, 7.5 grams of picric acid and 50 grams of cold concentrated sulfuric acid.

The mixture was heated to 135–140° C., whereupon the reaction became uncontrollable and the temperature rose to 175–180° C. The reflux condenser was removed and the water formed allowed to distill out freely. Upon completion of the vigorous exothermic reaction, the contents of the flask set to a black tar. This material was extracted for several hours with 250 cc. of water, and the black insoluble solid collected by filtration. The filtrate was discarded and the precipitate extracted with about 500 cc. of saturated boiling sodium acetate solution. The insoluble black tar was removed by filtration and discarded. Upon acidification of the filtrate with concentrated hydrochloric acid, a crystalline solid slowly separated. This solid was collected by filtration, washed with water, dried and used without further purification.

The 4-aminonaphthalene-1,6,-disulfonic acid used as above was purified as follows:

The material known to commerce as Dahl's acid, and consisting of a crude mixture of 4-aminonaphthalene-1,6-disulfonic acid and 4-aminonaphthalene-1,7-disulfonic acid, was dissolved in hot water with the aid of sodium acetate, and the hot solution filtered. The filtrate was treated with a large excess of acetic acid and allowed to crystallize. The crystalline material was collected by filtration, washed with ice water and sucked as dry as possible. The still wet cake was dissolved in hot water with just enough ammonium hydroxide to make a neutral solution and saturated with calcium chloride until an excess of calcium ion had been introduced. The mixture was maintained at the boiling point until the crystallization of the calcium salt seemed to be complete (about ½ hour). The hot suspension so obtained was filtered immediately, the collected calcium salt washed first with hot water and then with cold water and dried.

The calcium salt thus obtained was converted to the potassium salt by boiling with an excess of potassium carbonate. The precipitated calcium carbonate was removed by filtration, the filtrate acidified with a large excess of acetic acid and cooled. The crystalline material so obtained was used without further purification.

*Example IV*

9-AMINOBENZO(H)QUINOLIN-6-OL

Seventy grams of the potassium salt of 9-aminobenzo-(h)quinolin-6-sulfonic acid was reacted with 600 grams of 50% potassium hydroxide solution in an autoclave at 265° C. for 10 hours. The reaction mixture was filtered through a sintered glass funnel and the cake was washed with warm water to dissolve any soluble material. The combined filtrates were neutralized with hydrochloric acid to a pH of 7, then acidified to a pH of 5–6 with acetic acid, and finally neutralized to a pH of 7 with ammonium hydroxide. The product was collected by filtration and washed with water. The washed cake was suspended in 1 liter of water and dissolved by the addition of 50 ml. of concentrated hydrochloric acid. 140 grams of anhydrous sodium sulfate was dissolved in 400 ml. of water and added while hot to the acid solution heated to near boiling. The resulting mixture was then set aside to crystallize and finally chilled in ice. The separated product was collected on a Büchner funnel, washed with a small amount of cold water, followed by alcohol, and finally with low boiling petroleum ether and dried. A yield of 54 grams of the product was obtained.

The 9-aminobenzo(h)quinoline-6-sulfonic acid, used above, was prepared as follows:

100 grams of 9-hydroxybenzo(h)quinoline-6-sulfonic acid was suspended in 1 liter of 28% ammonium hydroxide containing 100 ml. of water saturated with sulfur dioxide at 15° C. This suspension was reacted in an autoclave at 250° C. for 24 hours. The resulting reaction mixture was then filtered and the filtrate heated under diminished pressure to remove excess ammonia. The residual solution was again filtered and made alkaline with potassium hydroxide to a pH of 11, after which it was heated to near boiling and solid potassium chloride, equivalent to 10% of the total weight, was added with stirring. The precipitated potassium salt was collected from the chilled solution by filtration and redissolved in approximately 1 liter of hot water. The solution was treated with Norit, filtered, reheated, and 10% of its weight of solid potassium chloride was added. The mixture was chilled and the purified potassium salt collected on a Büchner funnel. The filter cake was washed with a small amount of cold 10% potassium chloride solution and dried for use as stated above.

The 9-hydroxybenzo(h)quinolin-6-sulfonic acid, used above, was prepared by the following method:

100 grams of concentrated sulfuric acid was slowly added to 300 grams of chilled glycerol while keeping the temperature below 70° C. To this mixture was added 8 grams of picric acid (containing 10% of water) followed by 47.8 grams of powdered 8-amino-2-naphthol-5-sulfonic acid. This mixture was intimately stirred until a homogeneous slurry was obtained. The slurry was added in small portions to a 1-liter, 3-necked flask fitted with an agitator and thermometer and set in a molten metal bath maintained at 155–160° C. while the internal reaction temperature was held at 140–145° C. Addition of the slurry was made over an interval of one hour. After stirring for an additional 10–15 minutes to insure completeness of the reaction, the mixture was poured into 1 to 1.5 liters of water with stirring.

The precipitated product was collected by filtration and washed well with water, and then partially dried by washing with absolute alcohol. The crude cake was then suspended in 500 ml. of dimethylformamide, broken up in a Waring Blendor and the resulting suspension transferred to a beaker and heated to 70–80° C. The insoluble material was collected on a Büchner funnel and washed well with dimethylformamide, followed by absolute alcohol and then sucked nearly dry.

Thirty-three grams of anhydrous sodium acetate was dissolved in 1 liter of water, the filter cake was suspended therein and brought to a boil. The solution was then treated with Norit and filtered. The filtrate was again heated, solid sodium chloride equal to 10% of the weight was added and the resulting mixture stirred well to dissolve the salt. After chilling in ice for several hours, the precipiated sodium salt was collected by filtration.

The sodium salt thus obtained was redissolved in 1 liter of water with the aid of 10% sodium hydroxide solution (to form the more soluble disodium salt), again treated with Norit at near boiling temperature and filtered. The hot filtrate was acidified (to Congo paper) with concentrated hydrochloric acid, cooled to about room temperature and the product collected by filtration. The filter cake was washed well with water, followed by absolute alcohol and low boiling petroleum ether, then dried. The yield of pale yellow product was 50 grams.

The 8-amino-2-naphthol-5-sulfonic acid was prepared from purified 8-amino-2-naphthol by the process of German Patent 676,856.

The 8-amino-2-naphthol was prepared from crude 8-amino-2-naphthol as follows:

100 grams of the crude product was dissolved in 1700 ml. of water containing 90 ml. of concentrated hydrochloric acid. The suspension was heated to boiling by the direct introduction of steam, decolorized with Norit and filtered. Concentrated sodium acetate solution was added to the filtrate until neutral to Congo red paper, the solution again brought to boiling and decolorized and filtered. 900 ml. of ethanol was added to the filtrate and the solution heated to boiling, after which it was treated with 30–40 grams of decolorizing charcoal for 10–15 minutes and finally filtered into a flask containing 5–10 grams of solid sodium metabisulfite. Steam was passed into the resulting solution until boiling occurred. 200 ml. of concentrated sodium acetate solution was added with stirring and the mixture chilled in an ice bath. The product was collected on a large funnel, washed repeatedly with water, sucked dry and finally dried in a vacuum oven at 80° C.

*Example V*

9-ACETYLAMINOBENZO(H)QUINOLIN-6-OL

This compound was prepared by acetylation of 9-aminobenzo(h)quinolin-6-ol by the Schotten-Baumann reaction while using an excess of acetic anhydride and in the presence of aqueous sodium carbonate.

*Example VI*

9-AMINOBENZO(H)QUINOLIN-6-OL-X-SULFONIC ACID

To 100 grams of 100% sulfuric acid was added, at room temperature and with agitation, 14 grams of 9-aminobenzo(h)quinolin-6-ol hydrochloride. The mixture was warmed gently and then maintained at 40–60° C. for 3 hours. The mixture was poured onto 200 grams of ice and the resulting aqueous solution cooled. The crystalline solid so obtained was collected by filtration and washed with water. The solid was dissolved in dilute sodium bicarbonate solution, any insoluble material removed by filtration, and the filtrate acidified with hydrochloric acid, sufficient acid being added to make the solution about 6 N. The resulting crystalline solid was collected by filtration, washed with 2 N hydrochloric acid and dried.

*Example VII*

9-ACETYLAMINOBENZO(H)QUINOLIN-6-OL-X-SULFONIC ACID

This compound was made by acetylating the product of Example VI according to the Schotten-Baumann reaction while utilizing an excess of acetic anhydride in the presence of aqueous sodium carbonate.

*Example VIII*

9-P-TOLUENESULFONYLAMINOBENZO(H)QUINOLIN-6-OL-X-SULFONIC ACID 9-aminobenzo(h)quinolin-6-ol-X-sulfonic acid was dissolved in hot sodium acetate solution and an excess of p-toluenesulfonyl chloride added. Upon completion of the reaction, the mixture was acidified with hydrochloric acid and the precipitated material collected by filtration. The solid was triturated with bicarbonate solution, and the insoluble sodium salt so formed was further purified by crystallization from water.

*Example IX*

9-OCTADECYLSULFONYLAMINOBENZO(H)QUINOLIN-6-OL-X-SULFONIC ACID

Into a 500 cc. 3-necked flask, equipped with an agitator, a reflux condenser and a dropped funnel were placed 100 ml. of dry pyridine and 9.5 grams of 9-aminobenzo(h)-quinolin-6-ol-X-sulfonic acid. The mixture was stirred and heated for about 30 minutes. A solution of 12.6 grams of octadecylsulfonyl chloride in 50 ml. of dry pyridine was added dropwise to the reflux mixture during a period of 1 hour and the mixture further refluxed for 2 hours. The resulting solution was filtered to remove a small amount of insoluble yellow solid and evaporated as far as possible at 100° C. and 10 mm. pressure. The residue was dissolved in 300 ml. of water and filtered.

The filtrate was poured into a mixture of 100 ml. of concentrated hydrochloric acid and 100 grams of ice. The precipitated solid was collected by filtration and dissolved in hot water with the aid of potassium hydroxide. Solid potassium chloride was added until the precipitation of the potassium salt was complete and the hot suspension was filtered. The insoluble potassium salt so obtained was dissolved in hot water. The solution was treated with potassium chloride and the resulting suspension was filtered. This method of purification was repeated several times. Finally, the potassium salt was converted to the inner salt by acidifying the hot aqueous solution. The resulting solid was collected by filtration, washed with water and dried. The dark waxy material was then extracted with hot high boiling petroleum ether. The insoluble material was dried and then crystallized from dimethylformamide. The crystalline material was collected by filtration and thoroughly washed with acetone. This substance was used as a non-diffusing cyan color former without further purification.

*Example X*

9-TETRADECYLSULFONYLBENZO(H)QUINOLIN-6-OL-X-SULFONIC ACID

Into a 500 cc. 3-necked flask, equipped with an agitator, a water take-off reflux condenser and a heating mantle, were placed 75 ml. of pyridine, 50 ml. of dry benzene and 8.7 grams of 9-aminobenzo(h)quinolin-6-ol-X-sulfonic acid. The mixture was refluxed until no more water was apparent in the water separator and then 75 ml. of the mixed solvent was removed by distillation. The solution was cooled to room temperature and 9 grams of tetradecylsulfonyl chloride was added. The mixture was stirred at room temperature for 2 hours and then heated to reflux for 1 hour. The resulting solution was poured into a mixture of concentrated hydrochloric acid and ice. The insoluble solid was collected by filtration, and dissolved in water with the aid of sodium hydroxide. A neutral solution was obtained. This solution was treated with brine and the insoluble sodium salt was collected by filtration and crystallized from dilute brine. The solid was redissolved in hot water with the aid of excess alkali and the mixture rendered strongly acid with hydrochloric acid. The solid was collected by filtration, washed with water and then acetone, and dried. The material was further purified by dissolving in a small amount of hot dimethylformamide, adding acetic acid to the above solution until crystallization started and allowing the material to crystallize as the mixture cooled. The solid was collected by filtration, washed with acetone and dried. This substance was used as a non-diffusing cyan color former without further purification.

*Example XI*

9-(3'-NITROBENZENESULFONYL)AMINOBENZO(H) QUINOLIN-6-OL-X-SULFONIC ACID

In a 500 cc. 3-necked flask, equipped with an agitator and a condenser, were placed 150 ml. of pyridine and 20 grams of 9-aminobenzo(h)quinolin-6-ol-X-sulfonic acid. The mixture was heated to reflux and stirred for 10 minutes. 15 grams of 3-nitrobenzenesulfonyl chloride was introduced in small portions to the warm suspension during a period of 15 minutes. The resulting solution was heated with agitation until the intense red color had disappeared (about 1 hour). After the pyridine was removed by evaporation on a steam cone at reduced pressure, the residue was dissolved in 100 ml. of water with the aid of sodium hydroxide, and the solution so obtained was poured onto a mixture of 200 grams of ice and 300 ml. of water, sufficient sodium hydroxide being added to produce a neutral solution. The mixture was filtered to remove a small amount of insoluble material, heated to boiling and treated with 100 ml. of 30% brine. Upon cooling, a finely dispersed solid was obtained. This material was collected by filtration and dried, the yield being 24 grams.

*Example XII*

9-(3'-AMINOBENZENESULFONYL)AMINOBENZO(H) QUINOLIN-6-OL-X-SULFONIC ACID

The sulfonamide obtained in Example XI was added to a solution of 100 grams of sodium hydrosulfite in 500 grams of 10% aqueous sodium hydroxide. The resulting yellow solution was filtered, cooled and acidified with acetic acid. The yellow solid thus obtained was collected by filtration, washed with water and redissolved in hot water with the aid of sodium hydroxide. The product was reprecipitated by acidification, collected by filtration, dried and used without further purification. Yield—10 grams.

*Example XIII*

9-(3'-TETRADECANOYLAMINOBENZENESULFONYL) AMINOBENZO(H)QUINOLIN-6-OL-X-SULFONIC ACID

The amino sulfonamide of Example XII was dissolved in 75 ml. of pyridine. 15 ml. of dry benzene was added and the mixture was refluxed under a water take-off condenser until no more water was apparent in the distillate. A total of 7 ml. of the mixed solvent was removed by distillation and the residual mixture cooled. 2½ grams of myristoyl chloride, dissolved in 100 ml. of dry benzene, was added dropwise with stirring and agitation. When the addition was complete, the mixture was boiled and 25 ml. of the mixed solvent was removed by distillation. Twenty more drops of the myristoyl chloride was added and the mixture was stirred for an additional hour under reflux. The solution was poured into a mixture of 75 ml. of concentrated hydrochloric acid in 125 grams of ice, the precipitated solid collected by filtration, washed with water and pressed under a rubber dam. The yellow solid was then extracted with 200 ml. of boiling glacial acetic acid. The insoluble material was collected by filtration and thoroughly washed with hot acetic acid. The solid was dissolved in 50 ml. of hot dimethylformamide, decolorized and diluted with 150 ml. of hot glacial acetic acid. The solid, which separated upon cooling, was collected by filtration, washed first with acetic acid and then acetone. The product so obtained was dried and used without further purification as a non-diffusing cyan color former.

*Example XIV*

9-(7'-CARBOXY-2-NAPHTHYL)AMINOBENZO(H)QUINOLIN-6-OL-X-SULFONIC ACID

In a 500 cc. 3-necked flask, equipped with an agitator and a reflux condenser, were placed 100 ml. of water, 3.3 grams of sodium hydroxide, 5.2 grams of 7-hydroxy-2-naphthoic acid and 9 grams of the hydrochloride and 9-aminobenzo(h)quinolin-6-ol-X-sulfonic acid. The solution was heated almost to boiling, 50 grams of sodium metabisulfite added, and the resulting suspension refluxed for ½ hour and diluted with an additional 100 ml. of water. The mixture was further refluxed for 2 hours and then treated with an additional 50 grams of sodium metabisulfite. The resulting solution was refluxed overnight. After cooling the reaction mixture, the precipitated product was collected, washed with 30% brine, suspended in 500 ml. of boiling water and treated with hydrochloric acid until acid to Congo red paper. The suspension was boiled to expel sulfur dioxide and the insoluble solid was collected by filtration. The material was dissolved in hot dilute sodium acetate solution, treated with an excess of acetic acid at the boiling point and filtered hot to remove the insoluble starting material. After precipitating the product from the filtrate with acid, the product was collected, redissolved in dilute sodium acetate, treated with an excess of acetic acid and again filtered hot. The solid which separated from the filtrate upon cooling was collected by filtration, washed with water and dried. This material was used as a cyan color former without further purification.

*Example XV*

9-2'[7'-(1''-OCTADECYL-5''-SULFO-2''-BENZIMIDAZOYL) PHENYLCARBAMYL]NAPHTHYLAMINOBENZO(H) QUINOLIN-6-OL-X-SULFONIC ACID

Into a 500 cc. 3-necked flask, equipped with an agitator and a water take-off reflux condenser, were placed 100 ml. of dry pyridine and 100 ml. of dry benzene, 5 grams of 9 - (7'-carboxynaphthyl) aminobenzo(h) quinolin-6-ol-X-sulfonic acid and 5.0 grams of 1-octadecyl-2(4'-aminophenyl) benzimidazole-5-sulfonic acid and the mixture was refluxed until no more water was evident in the water take-off condenser. 100 ml. of the mixed solvent was removed by distillation. The mixture was then treated with a solution of 0.75 gram of phosphorous trichloride in 25 ml. of dry benzene. The reaction mixture was heated under reflux for 3 hours and the solvents were then removed by distillation at 100° C. and 15 mm. pressure. The residual syrup was dissolved in 100 ml. of water and the solution refluxed for 1½ hours. Excess 30% brine was added, whereupon the product separated as a brown gum. This material was redissolved in hot dilute aqueous sodium hydroxide, collected by filtration, washed with water and dried. The product was dissolved in 50 ml. of pyridine, 50 ml. of acetic anhydride was added and the mixture refluxed for 15 minutes. The product was precipitated by the addition of excess acetone, collected by filtration, washed with acetone and dried.

After refluxing the substance so obtained for 15 minutes with an excess of 1 N sodium hydroxide solution and reprecipitating by the addition of hydrochloric acid, the resulting solid was dissolved in hot dimethylformamide and glacial acetic acid was added. Upon cooling, a crystalline substance was collected which was used as a non-diffusing cyan color former without further purification.

*Txample XVI*

9,2'-[7'-(3''-SULFO-5''-OCTADECYLSULFONYLAMINO-6''-METHYL)PHENYLCARBAMYL]NAPHTHYLAMINO-BENZO(H)QUINOLIN-6-OL-X-SULFONIC ACID

The procedure for making the above compound is the same as that of Example XV, excepting that the benzimidazole-5-sulfonic acid of Example XV is replaced by an equivalent quantity of 6-myristoylamino-2-amino-toluene-4-sulfonic acid.

*Example XVII*

9-METHYLAMINOBENZO(H)QUINOLIN-6-OL

A mixture of 25 grams of benzo(h)quinolin-9-ol-6-sulfonic acid, 130 ml. of 40% aqueous naphthylamine solution and 20 ml. of saturated aqueous sulfur dioxide solution was placed in an autoclave and heated at 280° C. for 18 hours. The solution was decanted from the insoluble gum and treated with an excess of solid potassium hydroxide. The insoluble potassium salts so obtained were collected by filtration, dissolved in water and neutralized by the addition of hydrochloric acid. The mixture was acidified by the addition of acetic acid. The orange solid which precipitated was collected by filtration and extracted with cold dilute aqueous sodium bicarbonate. Any insoluble material was removed by decantation and filtration. The filtrate was treated with a few drops of hydrochloric acid and the first gummy precipitate was removed by filtration. The filtrate was acidified with an excess of acetic acid and the precipitated orange solid was collected by filtration, washed with water and dried. The product is 9-methylamino(h)quinolin-6-sulfonic acid.

9-methylamino(h)quinolin-6-sulfonic acid was added to 30 grams of 50% aqueous potassium hydroxide and the resulting suspension was heated in an autoclave at 265° C. for 10 hours. After diluting the reaction mixture with water to 100 ml., the solution was heated to boiling and filtered through a layer of Celite to remove the small amount of insoluble material. The filtrate was acidified with hydrochloric acid and then made neutral by the addition of ammonium hydroxide. After the first gummy precipitate solidified, the substance was collected by filtration and dissolved in hot dilute hydrochloric acid. The solution was cooled, filtered to remove the small amount of insoluble material and the filtrate made basic with ammonium hydroxide. The solid thus obtained was collected by filtration, washed with water, dried and used without further purification as a cyan color former.

*Example XVIII*

7-CARBOXYBENZO(H)QUINOLIN-6-OL

A mixture of 50 grams of 7-cyanobenzo(h)quinolin-6-sulfonic acid and 300 grams of 50% aqueous potassium hydroxide solution was heated in an autoclave at 265° C. for 10 hours. The resulting solution was filtered to remove a small amount of suspended extraneous material. The filtrate was treated with ice, partially neutralized by the addition of concentrated hydrochloric acid and the mixture finally brought to a pH of 5–6 by the addition of glacial acetic acid. The resulting suspension was heated to boiling and filtered. The product was dissolved in a solution of 40 ml. of concentrated hydrochloric acid in 2 liters of water at the boiling point. After filtering to remove a small amount of insoluble material, 100 ml. of a concentrated hydrochloric acid were added to the filtrate. The solid obtained upon cooling was collected by filtration and washed with water. The material was dissolved in 2 liters of boiling water containing 30 ml. of concentrated hydrochloric acid and the solution brought to a pH of 5–6 by the addition of saturated sodium acetate solution. The nearly white crystalline solid was collected by filtration, washed with water and further purified by crystallization from a mixture of dimethylformamide and glacial acetic acid. Yield—18 grams.

The 7-cyanobenzo(h)quinolin-6-sulfonic acid, used above, was prepared as follows:

Into a 3-liter, 3-necked flask, equipped with an agitator and a reflux condenser, were placed 110 grams of 7-aminobenzo(h)quinolin-6-sulfonic acid, 2 liters of water and 300 ml. of concentrated hydrochloric acid. The mixture was heated to reflux, whereupon all of the solid dissolved. The solution was cooled to 20° C. and the resulting suspension was diazotized by the dropwise addition of a solution of 30 grams of sodium nitrite in 125 ml. of water. The light yellow diazonium salt was collected by filtration and washed with ice water.

The still damp diazonium salt was added slowly to a previously prepared solution of 40 grams of cuprous cyanide and 64 grams of sodium cyanide in 640 ml. of water. During the addition, the cuprous cyanide solution was stirred and maintained at 60–70° C. When the addition was completed (15 minutes), the mixture was heated for ½ hour on a steam bath treated with 100 grams of solid sodium chloride, cooled and filtered. The solid so obtained was washed with 30% brine until free of cyanide.

The crude 7-cyanobenzo(h)quinolin-6-sulfonic acid was further purified by dissolving it in a liter of hot water, decolorizing and crystallizing by the addition of 30% brine. The substance so obtained was dissolved in hot water and the resulting solution treated with 50 ml. of concentrated hydrochloric acid. The product, which crystallized in the form of yellowish-brown flakes, was collected by filtration, washed with water, pressed under a rubber dam, washed with methanol and dried. Yield—100 grams.

The 7-aminobenzo(h)quinolin-6-sulfonic acid was prepared as follows:

Into a 5-liter, 3-necked flask, equipped with an agitator, condenser and a heating mantle were placed 2 liters of water, 5 ml. of glacial acetic acid, and 300 grams of iron filings. The mixture was heated to reflux for 15 minutes and then 167 grams of 7-nitrobenzo(h)quinolin-6-sulfonic acid was introduced in small portions with vigorous agitation. When the addition had been completed, the suspension was refluxed with agitation for still another ½ hour. 15 ml. of concentrated ammonium hydroxide solution was added and the mixture further refluxed for 2 hours. Sufficient concentrated ammonium hydroxide was then introduced to make the mixture distinctly alkaline and the hot suspension was then filtered. The filter cake was extracted with one liter of boiling water and thoroughly washed. The filtrate was neutralized to a pH of 7–8 with hydrochlorid acid, and then finally brought to a pH of 5–6 by the addition of glacial acetic acid. Upon cooling, a crystalline white solid separated which was collected by filtration, washed with water and dried.

The following procedure was used to form the 7-nitrobenzo(h)quinolin-6-sulfonic acid.

Into a 2-liter, 3-necked flask, equipped with a regulation stirrer and thermometer was placed 700 ml. of concentrated sulfuric acid. 183 grams of benzo(h)quinolin-6-sulfonic acid was added slowly with agitation. The resulting solution was cooled to −5° C. and treated dropwise with a solution of 52 grams of yellow fuming nitric acid (9.16%), dissolved in 75 ml. of concentrated sulfuric acid. After stirring for ½ hour at 0° C., the reaction mixture was allowed to warm up to room temperature. The mixture was poured into 2500 grams of ice, the precipitated solid collected by filtration and thoroughly washed with water. The solid was dissolved in 3 liters of hot water with the aid of aqueous sodium hydroxide solution. 200 grams of sodium chloride was added and the resulting suspension was heated to boiling for several minutes and then filtered. The solid so obtained represents the isomer whose composition was not determined. The filtrate was cooled in an ice bath and the crystalline solid was collected and washed with 10% brine. Acidification of the mother liquor gave an additional small quantity of the same material. The fine solid so obtained was dissolved in 2 liters of hot water, the solution decolorized and then strongly acidified with hydrochloric acid. The precipitated crystalline solid was collected by filtration, pressed under a rubber dam, washed with methanol and dried. Yield—167 grams.

*Example XIX*

9-[2'-(4',6'-DIMETHYLAMINO-1,3,5-TRIAZINYLAMINO)] BENZO(H)QUINOLIN-6-OL-X-SULFONIC ACID

Into a 1-liter, 3-necked flask, equipped with a stirrer, a reflux condenser and a thermometer and surrounded by an ice bath, were placed 300 ml. of ice water and 4.75 grams of potassium 9-aminobenzo(h)quinolin-6-ol-x-sulfonic acid. A solution of 2.8 grams of purified cyanuric chloride in 25 ml. of acetone was then introduced and the mixture was stirred at 0° C. for 1 hour while a solution of .81 gram of potassium hydroxide in 25 ml. of water was added dropwise at such a rate that the pH was always maintained at approximately 7. At the end of the above addition, 65 grams of 30% aqueous methylamine solution was introduced and the mixture was heated on a steam bath for 2 hours. The resulting solution was acidified with hydrochloric acid and the precipitated solid was collected by filtration and washed with water. The material so obtained was dissolved in hot water with the aid of just enough sodium hydroxide to cause solution. The solution was decolorized and 30% aqueous sodium chloride solution was added until the material just started to crystallize. The suspension was cooled, the crystalline solid collected by filtration, washed with a small amount of ice water and dried. This substance was used as a cyan color former without purification.

*Example XX*

6-AMINOBENZO(H)QUINOLIN-9-OL

A mixture of 103 grams of benzo(h)quinolin-6,9-diol, 1,000 ml. of concentrated ammonium hydroxide and 100 ml. of water saturated with sulfur dioxide at 15° C. was placed in an autoclave and heated at 210° C. for 10 hours. The autoclave was opened and 100 ml. of water containing 10 grams of sodium hydroxide added. The insoluble material was collected by filtration, washed with water and dissolved in 1,500 ml. of water containing 100 grams of concentrated hydrochloric acid. The solution was heated to boiling and decolorized and the filtrate treated with 150 ml. of concentrated hydrochloric acid. The material which came out upon cooling was collected by filtration and washed with 3 N hydrochloric acid. The filtrate was suspended in a liter of water and the mixture made alkaline (pH 11–12) with sodium hydroxide. The insoluble solid was removed by filtration. The filtrate was neutralized with acetic acid, the insoluble material collected and thoroughly extracted with concentrated ammonium hydroxide. The insoluble portion was dissolved in 500 ml. of water with the aid of hydrochloric acid and sufficient hydrochloric acid then added to initiate crystallization at the boiling point. Upon cooling, the crystalline hydrochloride of the 6-aminobenzo(h)quinolin-9-ol separated. This material was collected, washed and dried.

*Example XXI*

6-P-TOLUENESULFONAMIDOBENZO(H)QUINOLIN-9-OL

Into a 1-liter, 3-necked flask fitted with a stirrer, a water separator, and a heating mantle, were placed 250 ml. of pyridine, 39.5 grams of 6-aminobenzo(h)quinolin-9-ol hydrochloride and 100 ml. of dry benzene. The mixture was refluxed until no more water was apparent in the separator and 100 ml. of the mixed solvent was collected. The residue was treated at 30° C. with 34.3 grams of p-toluenesulfonylchloride, dissolved in 50 ml. of dry benzene and added over a period of 30 minutes. After 21 hours at room temperature, the mixture was heated to 90° C. for 3 hours. The solid which separated upon cooling was collected by filtration, and washed with a small amount of cold pyridine. The cake was dissolved in 200 ml. of a 1:1 mixture of concentrated ammonium hydroxide in water at 60–70° C. After decolorization, the solution was strongly acidified with concentrated hydrochloric acid (about 250 cc.), chilled in ice and the solid collected by filtration. The yield was 34 grams.

PROCESSING

*Example XXII*

To 1 kilo of a silver bromide-iodide emulsion is added 7 grams of 9-(3'-tetradecanoylaminobenzenesulfonyl)-aminobenzo(h)quinolin-6-ol-x-sulfonic acid, and the emulsion coated on a suitable support. The resulting film is exposed and developed in a black and white developer. The film is thoroughly washed and the residual silver halide re-exposed and developed in a developer of the following composition:

| | | |
|---|---|---|
| 4-hydroxyethylamino-6-phenylamino metanilic acid | grams | 1.5 |
| Sodium sulfite | do | 30 |
| Potassium carbonate | do | 40 |
| Pyridine | cc | 12 |
| Water to make 1 liter. | | |

The film is washed, bleached and fixed in the conventional manner to yield a cyan azine dye image of great brilliancy.

*Example XXIII*

The procedure is the same as in Example XXII, excepting that the color former employed is that disclosed in Example XV.

*Example XXIV*

A silver bromide emulsion is exposed and color developed in a developer of the following constitution:

| | Grams |
|---|---|
| 4,6-diphenylamine metanilic acid | 1.5 |
| Sodium sulfite | 30 |
| Potassium carbonate | 40 |
| Pyridine | 12 |
| 9-(7'- carboxy-2'-naphthyl)aminobenzo(h)quinolin-6-ol-X-sulfonic acid | 1 |
| Water to make 1 liter. | |

The film is washed, bleached and fixed in the customary manner. A brilliant negative cyan azine dye image remains.

The following table illustrates the color of the dyestuff images obtained when using other color formers with the developer of Example I.

| Coupler | Color of Formed Dye |
|---|---|
| Benzo(h)quinolin-5-ol | Cyan. |
| Benzo(h)quinolin-6-ol | Do. |
| Benzo(h)quinolin-6,9-diol | Blue-cyan. |
| 9-Aminobenzo(h)quinolin-6-ol | Do. |
| 9-Methylaminobenzo(h)quinolin-6-ol | Cyan. |
| 7-Carboxybenzo(h)quinolin-6-ol | Do. |

It is to be emphasized that when the color coupler is a benzo(h)quinolin-9-ol, containing in the 6-position, either an amino or sulfonamido group, coupling takes place on the 5,6-double bond with the elimination of ammonia on the one hand, or the sulfonamide group on the other hand. Assuming that the same developer is used, then the dyes obtained from the 6-amino and 6-sulfonamido derivatives are identical with those obtained from benzo(h)quinolin-6,9-diol.

It will be observed that in referring to certain of the color formers provided with a sulfo group that the position of such group has been indicated generally by the letter "X." It appears from our experience that the sulfo group enters the 7-position of the benzo(h) quinoline. However, since we have been unable to establish this as a definite fact, it is considered preferable to generally indicate the positioning of the sulfo group.

Various modifications of the invention will occur to persons skilled in the art, and we, therefore, do not intend to be limited in the patent granted except as necessitated by the prior art and the appended claims.

We claim:

1. The process of producing cyan azine dye images by color forming development which comprises exposing a silver-halide emulsion and developing the same with a 2,4-diamino-aniline developer in the presence of a color former having the following formula:

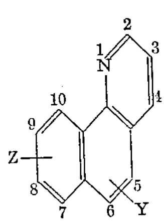

in which Y is selected from the class consisting of OH, $NH_2$, and $NHSO_2R$, R being selected from the class consisting of aliphatic and aromatic radicals, and Z is a member selected from the class consisting of hydrogen, hydroxyl, an amino and an acylamino group Y being located only in one of the positions designated as 5- and 6- and Z being located only in one of the positions designated as 8-, 9- and 10-.

2. The process as defined in claim 1, wherein the color former is 9-(7'-carboxy-2-naphthyl)aminobenzo(h)quinolin-6-ol-X-sulfonic acid.

3. The process as defined in claim 1, wherein the color former is 9-octadecylsulfonylaminobenzo(h)quinolin-6-ol-X-sulfonic acid.

4. The process as defined in claim 1, wherein the color former is 9,2'-[7'-(1''-octadecyl-5''-sulfo-2''-benzimidazoyl)phenylcarbamyl]naphthylaminobenzo(h)quinolin-6-ol-X-sulfonic acid.

5. The process as defined in claim 1, wherein the color former is 9-[2'-(4',6'-dimethylamino-1,3,5-triazinylamino)]benzo(h)quinolin-6-ol-X-sulfonic acid.

6. A photographic silver-halide emulsion containing as a color former a compound of the following formula:

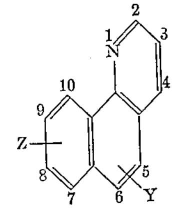

in which Y is selected from the class consisting of OH, $NH_2$, and $NHSO_2R$, R being selected from the class consisting of aliphatic and aromatic radicals, and Z is a member selected from the class consisting of hydrogen, hydroxyl, an amino and an acylamino group Y being located only in one of the positions designated as 5- and 6- and Z being located only in one of the positions designated as 8-, 9- and 10-.

7. A photographic silver-halide emulsion containing as the color former 9-(7'-carboxy-2-naphthyl)aminobenzo-(h)quinolin-6-ol-X-sulfonic acid.

8. A photographic silver-halide emulsion containing as the color former 9-octadecylsulfonylaminobenzo(h)quinolin-6-ol-X-sulfonic acid.

9. A photographic silver-halide emulsion containing as the color former 9,2'-[7'-(1''-octadecyl-5''sulfo-2''-benzimidazoyl)phenylcarbamyl]naphthylaminobenzo(h)-quinolin-6-ol-X-sulfonic acid.

10. A photographic silver-halide emulsion containing as the color former 9-[2'-(4',6'-dimethylamino-1,3,5-triazinylamino)]benzo(h)quinolin-6-ol-X-sulfonic acid.

11. A photographic developer containing as a reducing agent a 4,6-diamino metanilic acid, and as the color former a compound of the following formula:

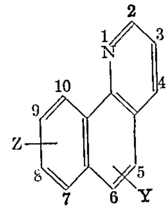

in which Y is selected from the class consisting of OH, $NH_2$, and $NHSO_2R$, R being selected from the class consisting of aliphatic and aromatic radicals, and Z is a member selected from the class consisting of hydrogen, hydroxyl, an amino and an acylamino group Y being located only in one of the positions designated as 5- and 6- and Z being located only in one of the positions designated as 8-, 9- and 10-, said compound being free from groups rendering the compound non-diffusing in photographic emulsions.

12. A photographic developer containing as a reducing agent a 4,6-diamino metanilic acid, and as the color former 9-(7'-carboxy-2-naphthyl)aminobenzo(h)quinolin-6-ol-X-sulfonic acid.

13. The process as defined in claim 1, wherein Y is OH and Z is an amino group.

14. The process as defined in claim 1, wherein Y is OH and Z is an acylamino group.

15. The process as defined in claim 1, wherein Y is OH which is located in the 6-position, and Z is an amino group located in the 9-position.

16. The process as defined in claim 1, wherein Y is OH located in the 6-position, and Z is an acylamino group located in the 9-position.

17. The process as defined in claim 1, wherein the color former contains a sulfonic acid group.

18. The composition as defined in claim 6, wherein Y is OH, and Z is an amino group.

19. The composition as defined in claim 6, wherein Y is OH, and Z is an acylamino group.

20. The composition as defined in claim 6, wherein Y is OH which is located in the 6-position and Z is an amino group located in the 9-position.

21. The composition as defined in claim 6, wherein Y is OH located in the 6-position, and Z is an acylamino group located in the 9-position.

22. The composition as defined in claim 11, wherein Y is OH, and Z is an amino group.

23. The composition as defined in claim 11, wherein Y is OH, and Z is an acylamino group.

24. The composition as defined in claim 11, wherein Y is OH located in the 6-position and Z is an amino group located in the 9-position.

25. The composition as defined in claim 11, wherein Y is OH located in the 6-position and Z is an acylamino group located in the 9-position.

References Cited in the file of this patent

UNITED STATES PATENTS 2,525,502 Tulagin et al. ---------- Oct. 10, 1950